United States Patent Office 3,345,327
Patented Oct. 3, 1967

3,345,327
STABILIZATION OF PROPYLENE
Martin Dexter, Briarcliff Manor, and Kathleen D. Schafer, Bronx, N.Y., assignors to Geigy Chemical Corporation, Greenburgh, N.Y., a corporation of Delaware
No Drawing. Original application June 6, 1964, Ser. No. 373,078. Divided and this application May 11, 1965, Ser. No. 462,467
3 Claims. (Cl. 260—45.85)

This application is a divisional application of our copending application Ser. No. 373,078, filed June 6, 1964, now abandoned, which is a continuation-in-part of our copending application, Ser. No. 188,275, filed Apr. 17, 1962, now abandoned.

The present invention pertains to certain diesters, to compositions which are stabilized by these diesters and to various novel uses of these diesters.

In particular, this invention pertains to compounds of the formula:

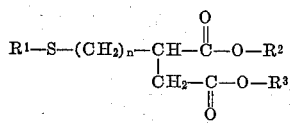

in which:

$R^1$ is alkyl of from 8 to 18, preferably 12 to 18
each of $R^2$ and $R^3$ if alkyl from 12 to 30 carbon atoms, preferably 12 to 18 carbon atoms, and
$n$ has a value of zero to one.

$R^1$, $R^2$ and $R^3$ may be the same or may be different and include, insofar as defined above, such alkyl groups as octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl and triaconyl. Embraced within these groups are both the straight and branch chain alkyl groups.

The compounds of the present invention have as their characteristic property the ability to vastly improve the effect of numerous other compounds which are used as stabilizers for organic material normally subject to deterioration. Thus while the compounds of the present invention may be considered as stabilizers in their own right, their properties are such that they would be more conventionally classified as "synergists" in that when combined with known stabilizers, they exhibit the ability to increase to total stabilization to a degree far exceeding that which could be expected from the additive properties of the individual components.

Organic materials which, being normally subject to deterioration, are often stabilized by the addition of various stabilizing compound and which therefore are suitable for the further addition of compounds of the present invention include for example synthetic organic polymeric substances such as vinyl resins formed by the polymerization of vinyl halides or from the copolymerization of vinyl halides with unsaturated polymerizable compounds, e.g., vinyl esters, α,β-unsaturated esters, α,β-unsaturated acids, α,β-unsaturated ketones or aldehydes and unsaturated hydrocarbons such as butadiene and styrene; poly-α-olefins such as polypropylene, polyethylene, polybutylene, polyisoprene and the like, including copolymers of α-olefins; polyurethanes such as are prepared from polyols and organic polyisocyanates; polyamides such as poly(hexamethylene adipamide); polyesters such as poly(methylene terephthalates); polycarbonates; polyacetals; polystyrene; poly(ethylene oxide); copolymers such as those formed by the copolymerization of acrylonitrile, butadiene and/or styrene; as well as physical mixtures of the above such as high impact polystyrene containing copolymers of butadiene and styrene; urea-formaldehyde-alkyd finishes and the like.

Other materials so stabilized include lubricating oils such as those of the aliphatic ester type, e.g., dihexyl azelate, di-(2-ethylhexyl)azelate, di-(3,5,5-trimethylhexyl) glutarate, di - (3,5,5 - trimethylpentyl)-glutarate, di-(2-ethylhexyl)pimelate, di-(2-ethylhexyl)-adipate, diisoamyl adipate, triamyl tricarballate, pentaerythritol tetracaproate, dipropylene glycol dipelargonate, 1,5-pentanediol di-(2-ethylhexanoate), and the like; fats and oils of animal and vegetable origin, e.g., linseed oil, menhaden oil, cod liver oil, castor oil, olive oil, rapeseed oil, coconut oil, palm oil, corn oil, sesame oil, peanut oil, cotton seed oil, butter, fat, lard, beef tallow and the like; saturated and unsaturated hydrocarbons such as for example, both natural and synthetic gasolines, jet fuels, diesel oils, mineral oils, fuel oils, drying oils, waxes and resins.

The compounds of this invention exhibit their novel properties when combined with a wide variety of stabilizers, some of which are known and some of which are the subject of copending applications. Primarily these are of the broad class of phenolic antioxidants.

Typical of the phenolic antioxidants whose stabilizing properties are improved by the addition of the compounds of the present invention, are the following:

CLASS A.—PHENOLIC TRIAZINE STABILIZERS 6-(4-hydroxy-3-methyl-5-t-butylanilino-2,4-bis-(n-octylthio)-1,3,5-triazine
6-(4-hydroxyanilino)-2,4-bis-(n-octylthio)-1,3,5-triazine
6-(hydroxy-3,5-dimethylanilino)-2,4-bis-(n-octylthio)-1,3,5-triazine
6-(4-hydroxy-3,5-di-t-butylanilino)-2,4-bis-(n-octylthioethylthio)-1,3,5-triazine
6-(4-hydroxyphenoxy)-2,4-bis-(n-octylthio)-1,3,5-triazine
2,4-bis-(4-hydroxy-3,5-di-t-butylphenoxy)-6-(n-octylthio)-1,3,5-triazine
2,4,6-tris-(4-hydroxy-3,5-di-t-butylphenoxy)-1,3,5-triazine
6-(4-hydroxy-3,5-di-t-butylanilino)-2,4-bis-(phenoxy)-1,3,5-triazine
6-(4-hydroxy-3,5-di-t-butylanilino)-4-(4-hydroxy-3,5-di-t-butylphenoxy)-2-(n-octylthio)-1,3,5-triazine
2,4,6-tris-(4-hydroxy-3,5-di-t-butylphenoxy)-1,3,5-triazine
6-(4-hydroxy3,5-di-t-butylphenoxy)-2,4-bis-(n-octylthioethylthio)-1,3,5-triazine
6-(4-hydroxy-3,5-di-t-butylanilino)-2,4-bis-(n-octylthio)-1,3,5-triazine
6-(4-hydroxy-3-methylphenoxy)-2,4-bis-(n-octylthio)-1,3,5-triazine
6-(4-hydroxy-3-t-butylphenoxy)-2,4-bis-(n-octylthioethylthio)-1,3,5-triazine
6-(4-hydroxy-3-methyl-5-t-butylphenoxy)-2,4-bis(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butylphenoxy)-1,3,5-triazine
2,4-bis-(4-hydroxy-3,5-di-t-butylphenoxy)-6-amino-1,3,5-triazine
2,4-bis-(4-hydroxy-3,5-di-t-butylphenoxy)-6-dimethylamino-1,3,5-triazine
2,4-bis-(4-hydroxy-3,5-di-t-butylphenoxy)-6-dodecylamino-1,3,5-triazine
2,4-bis-(4-hydroxy-3,5-di-t-butylphenoxy)-6-(di-2-ethylhexyl)amino-1,3,5-triazine
2,4-bis-(4-hydroxy-3,5-di-t-butylphenoxy)-6-dibutylamino-1,3,5-triazine 2,4-bis(4-hydroxy-3,5-di-t-butylanilino)-6-(n-octylthio)-
1,3,5-triazine
6-(4-hydroxy-3,5-di-t-butylphenoxy)-2,4-bis-(n-octyl-
thiopropylthio)-1,3,5-triazine
6-(4-hydroxy-3,5-di-t-butylphenoxy)-2,4-bis-(n-dodecyl-
thioethylthio)-1,3,5-triazine
2,4-bis-(4-hydroxy-3,5-di-t-butylphenoxy)-6-butylthio-
1,3,5-triazine
2,4-bis-(4-hydroxy-3,5-di-t-butylphenoxy)-6-(n-octa-
decylthio)-1,3,5-triazine
2,4-bis-(4-hydroxy-3,5-di-t-butylphenoxy)-6-(n-dodecyl-
thio)-1,3,5-triazine
2,4-bis-(4-hydroxy-3,5-di-t-butylphenoxy)-6-(n-octyl-
thiopropylthio)-1,3,5-triazine
2,4-bis-(4-hydroxy-3,5-di-t-butylphenoxy)-6-(n-octyl-
thioethylthio)-1,3,5-triazine
2,4-bis-(4-hydroxy-3,5-di-t-butylphenoxy)-6-(n-dodecyl-
thioethylthio)-1,3,5-triazine The above phenolic triazine stabilizers are more fully described in the copending application of Martin Dexter et al., Ser. No. 361,533, filed Apr. 21, 1964, now U.S. 3,255,191.

CLASS B.—PHENOLIC PHOSPHONATE STABILIZERS

Among the many phosphonate stabilizers whose properties are improved by the addition of compound of the present invention are the di-(lower)alkyl phosphonates disclosed in U.S. Patent No. 3,006,945. Particularly valuable phenolic phosphonates in this regard however are the di-(higher)alkyl phenolic phosphonates, i.e., having from 14 to 30 carbon atoms in each alkyl group. Representative of these are the following:

Di-n-octadecyl 3-t-butyl-4-hydroxy-5-methylbenzylphos-
phonate
Di-n-octadecyl 1-(3,5-di-t-butyl-4-hydroxyphenyl)-ethane-
phosphonate
Di-n-tetradecyl 3,5-di-t-butyl-4-hydroxybenzylphos-
phonate
Di-n-hexadecyl 3,5-di-t-butyl-4-hydroxybenzylphos-
phonate
Didocosyl-3,5-di-t-butyl-4-hydroxybenzylphosphonate
Di-n-octadecyl 3,5-di-t-butyl-4-hydroxybenzylphosphonate The above di-(higher)alkyl phenolic phosphonates are more fully described in the copending application of John Spivack, Ser. No. 308,345, filed Sept. 12, 1963, now abandoned.

CLASS C.—PHENOLIC ESTER STABILIZERS

Sub-class C–I n-Octadecyl 3-(3,5-di-t-butyl-4-hydroxyphenyl)-pro-
pionate
n-Octadecyl 3,5-di-t-butyl-4-hydroxyphenylacetate
n-Octadecyl 3,5-di-t-butyl-4-hydroxybenzoate
n-Hexyl 3,5-di-t-butyl-4-hydroxyphenylbenzoate
n-Dodecyl 3,5-di-t-butyl-4-hydroxyphenylbenzoate
Neo-dodecyl 3-(3,5-di-t-butyl-4-hydroxyphenyl)-pro-
pionate
Dodecyl β-(3,5-di-t-butyl-4-hydroxyphenyl)-propionate
Ethyl α-(4-hydroxy-3,5-di-t-butylphenyl)-isobutyrate
Octadecyl α-(4-hydroxy-3,5-di-t-butylphenyl)-isobutyrate
Octadecyl α-(4-hydroxy-3,5-di-t-butylphenyl)-propionate

Sub-class C–II 2-(n-octylthio)ethyl 3,5-di-t-butyl-4-hydroxybenzoate
2-(n-octylthio)ethyl 3,5-di-t-butyl-4-hydroxyphenylacetate
2-(n-octadecylthio)ethyl 3,5-di-t-butyl-4-hydroxyphenyl-
acetate
2-(n-octadecylthio)ethyl 3,5-di-t-butyl-4-hydroxybenzoate
2-(2-hydroxyethylthio)ethyl 3,5-di-t-butyl-4-hydroxy-
benzoate
β,β'-Thiodiethyl bis(3,5-di-t-butyl-4-hydroxyphenyl-
acetate)
Diethylene glycol bis-[3-(3,5-di-t-butyl-4-
hydroxyphenyl)propionate]
2-(n-octadecylthio)ethyl 3-(3,5-di-t-butyl-4-
hydroxyphenyl)propionate
Thio-bis-[ethylene 3-(3,5-di-t-butyl-4-hydroxy-
phenyl)propionate]
Stearamido N,N-bis-[ethylene 3-(3,5-di-t-butyl-
4-hydroxyphenyl)propionate]
n-Butylimino N,N-bis-[ethylene 3-(3,5-di-t-butyl-
4-hydroxyphenyl)propionate]
2-(2-stearoyloxyethylthio)ethyl 3,5-di-t-butyl-
4-hydroxybenzoate
2-(2-hydroxyethylthio)ethyl 7-(3-methyl-5-t-
butyl-4-hydroxyphenyl)heptanoate
2-(2-stearoyloxyethylthio)ethyl 7-(3-methyl-
5-t-butyl-4-hydroxyphenyl)heptanoate

Subclass C–III 1,2-propylene glycol bis-[3-(3,5-di-t-butyl-
4-hydroxyphenyl)propionate]
Ethylene glycol bis-[3-(3,5-di-t-butyl-4-
hydroxyphenyl)propionate]
Neopentylglycol bis-[3-(3,5-di-t-butyl-4-
hydroxyphenyl)propionate]
Ethylene glycol bis-(3,5-di-t-butyl-4-
hydroxyphenylacetate)
Glycerine-1-n-octadecanoate-2,3-bis-(3,5-
di-t-butyl-4-hydroxyphenylacetate)
Tetra-[methylene 3-(3,5-di-t-butyl-4-
hydroxyphenyl)propionate]methane
n-Propyl 1,1,1-tris-[methylene 3-(3,5-di-
t-butyl-4-hydroxyphenyl)propionate]
Sorbitol hexa-[3-(3,5-di-t-butyl-4-hydroxy-
phenyl)propionate]
1,2,3-butanetriol tris-[3-(3,5-di-t-butyl-
4-hydroxyphenyl)propionate]
2-hydroxyethyl 7-(3-methyl-5-t-butyl-4-
hydroxyphenyl)heptanoate
2-stearoyloxyethyl 7-(3-methyl-5-t-butyl-
4-hydroxyphenyl)heptanoate The above phenolic ester stabilizers of sub-classes C–I, C–II and C–III are more fully described in the copending applications of Martin Dexter et al., Ser. No. 354,434, filed Mar. 24, 1964, Ser. No. 354,464, filed Mar. 24, 1964 and Ser. No. 359,460, filed Apr. 13, 1964, respectively.

CLASS D.—PHENOLIC HYDROCARBON STABILIZERS 4,4'-butylidene-bis-(6-t-butyl-m-cresol)
4,4'-thio-bis-(6-t-butyl-m-cresol)
4,4'-methylene-bis-(2,6-di-t-butylphenol)
2,2'-methylene-bis[4-hydroxy-6-(1-methylcyclo-
hexyl)phenol]
1,3,5-trimethyl-2,4,6-tris-(4-hydroxy-3,5-di-t-
butylbenzyl)benzene
2,6-di-t-butylphenol
1,1,3-tris-(5-t-butyl-4-hydroxy-2-methylphenyl)-
butane
4,4'-isopropylidene-bis-(2-t-butylphenol)

The above phenolic hydrocarbon stabilizers are known and many are commercially available.

In addition to one or more of the above phenolic sttabilizers, it is often advantageous to employ other additives such as ultraviolet light absorbers, e.g., 2-hydroxy-4-methoxybenzophenone, 2-(2'-hydroxy-5'-methylphenyl) benztriazole, etc.; various phosphite compounds such as trioctylphosphite, dilaurylphosphite, tris(nonylphenyl) phosphite and the like. Such two, three or four component systems, when including a compound of the present invention, exhibit far superior properties to the additive properties of the individual components.

Other materials often added to such organic materials, depending upon the substrate, include pourpoint depressants, corrosion and rust inhibitors, metal deactivators, demulsifiers, antifoam agents, carbon black, accelerators, plasticizers, color stabilizers, heat stabilizers, dyes, pigments and the like.

The dialkyl alkylthiodiesters of the present invention are preferably used in a concentration of from 0.005% to about 10% by weight of the total composition together with one or more of the above phenolic antioxidants, one or more ultraviolet light absorbers and/or one or more of the above phosphite compounds. These are particularly useful in synthetic organic polymeric substances such as polypropylene, polyethylene, polystyrene and the like to protect such substances from deterioration both during use and during processing such as milling polypropylene or blow molding polyethylene. The compounds of the present invention exhibit superior compatability in diverse substrates with little or no odor formation.

The compounds of the Formula I may be prepared from maleic anhydride or itaconic anhydride and a suitable alcohol in the presence of p-toluene sulfonic acid to yield the corresponding diester. The diester of maleic acid or itaconic acid so obtained is then reacted with an alkyl mercaptan in the presence of sodium methylate to yield the diester of an alkylmercaptosuccinic acid or of an alkylmercaptomethylsuccinic acid. Alternatively mercaptosuccinic acid of mercaptomethylsuccinic acid may be reacted with an alcohol or the mixture of alcohols. In another process, the alkylmercaptosuccinic acid or alkylmercaptomethylsuccinic acid is reacted with a suitable alcohol to yield the desired diester. Suitable methods of making certain of the compounds of the Formula I are also illustrated by U.S. Patents 2,561,673 and 2,581,514.

The following examples, presented for illustration and not limitation, will further serve to typify the nature of the present invention. In these examples, parts are by weight unless otherwise indicated and the relation of parts by weight to parts by volume as is that of grams to cubic centimeters. Temperature is expressed in degrees centigrade.

*Example 1.—Didodecyl n-dodecylthiosuccinate*

(a) Maleic anhydride (24.5 parts), dodecyl alcohol (102.6 parts) and p-toluene sulfonic acid (1.1 parts) are refluxed in 100 parts by volume of benzene and the water formed is removed as azeotrope. In this manner 4.4 parts by volume of water are obtained (theory 4.5 parts) and the acid number is constant after 1¾ hours. The benzene is then removed in vacuo, whereupon the residue crystallizes. The didodecyl maleate thus obtained is recrystallized from ethanol to give 95.7 parts of didodecyl maleate, M.P. 28–30° C.

(b) To 0.14 part of sodium methylate in 5 parts by volume of methanol are added 10.1 parts n-dodecylmercaptan. Didodecyl maleate (22.6 parts) is then added with stirring and cooling so that the temperature does not exceed 34°. The reaction mixture is set aside for several days and then slurried with 20 parts by volume of water and filtered. This material is then evaporated to dryness and recrystallized from isopropanol to yield didodecyl n-dodecylthiosuccinate, M.P. 36–38° C.

Calculated: C, 73.33; H, 12.01; S, 4.89. Found: C, 73.30; H, 12.37; S, 4.98.

*Example 2.—Di(n-octadecyl) n-dodecylthiosuccinate*

(a) To a mixture of 86.1 parts of diethyl maleate and 101.2 parts of n-dodecylmercaptan are added 4 drops of a 40% solution of benzyltrimethylammonium methoxide in methanol. The temperature rises to approximately 75° and the reaction mixture is then allowed to cool to room temperature and is filtered.

The product, diethyl n-dodecylthiosuccinate, distills at 140–146° C./0.05 mm.

Calculated: C, 64.07; H, 10.31. Found: C, 64.13; H, 10.22.

(b) Diethyl n-dodecylthiosuccinate (11.24 parts) and 16.23 parts n-octadecyl alcohol are refluxed in 50 parts by volume of toluene to remove any water present. Sodium methylate (0.5 part) is then added and the reaction mixture heated to transesterify and remove the ethanol formed as an ethanol-toluene azeotrope. After the theoretical amount of ethanol has been obtained, the reaction mixture is diluted with 50 parts by volume of toluene, filtered hot and concentrated. The di(n-octadecyl) n-dodecylthiosuccinate thus obtained solidifies on standing and is recrystallized from isopropanol, M.P. 42–44° C.

By utilizing an equivalent amount of n-octylmercaptan for n-dodecylmercaptan in part (a) of this example and thereafter executing the procedure of part (b), there is obtained di(n-octadecyl) n-octylthiosuccinate.

*Example 3.—Di(n-dodecyl) n-octadecylthiosuccinate*

Diethylmaleate (12.91 parts) and 12.5 parts of octadecylmercaptan are allowed to react in the presence of benzyltrimethylammonium methoxide according to the procedure of Example 2(a). The diethyl n-octadecylthiosuccinate thus obtained is then treated with n-dodecyl alcohol (11.18 parts of alcohol to 13.76 parts of diester) according to the procedure of Example 2(b) to yield di(n-dodecyl) n-octadecylthiosuccinate, M.P. 41–42° C.

*Example 4.—Didodecyl dodecylthiomethylsuccinate*

(a) Twenty-eight parts of itaconic anhydride, 93.2 parts of n-dodecyl alcohol, 1 part of p-toluene sulfonic acid, 0.56 part of hydroquinone and 100 parts by volume of toluene are refluxed for 3½ hours, collecting the toluene-water azeotrope which is formed. The reaction mixture is then clarified with charcoal and the toluene next removed under reduced pressure, employed a bath temperature of about 60° C. The residue is allowed to solidify and is then recrystallized from hexane to yield didodecyl itaconate.

(b) To a reaction vessel equipped with a mechanical stirrer are added 43.98 parts of n-dodecylmercaptan. This is warmed to about 40° C. and 0.71 part of sodium methoxide are added. Didodecyl itaconate, obtained in part (a) of this example, is melted and added dropwise to the reaction mixture over a period of approixately 1 hour so as to maintain a reaction temperature of from 40–45° C. At the end of this time the reaction mixture is dissolved in 125 parts by volume of toluene and a small amount of glacial acetic acid is added to discharge the green color. The toluene solution is then extracted with 50 parts by volume of a 10% aqueous solution of sodium bicarbonate and washed with water until a neutral wash is obtained. The organic layer is separated, clarified, dried over magnesium sulfate and filtered. The toluene is removed from the filtrate under reduced pressure and the residue recrystallized from a mixture of about 600 parts by volume of isopropanol and about 50 parts by volume of methanol and dried to yield didodecyl dodecylthiomethylsuccinate, M.P. 34–35° C.

In a similar fashion from equivalent amount of the appropriate alkanol and alkyl mercaptan, there are respectively obtained the compounds didodecyl octylthiomethylsuccinate, didodecyl octadecylthiomethylsuccinate, dioctadecyl dodecylthiomethylsuccinate, M.P. 51.5–53° C., and dioctadecyl octadecylthiomethylsuccinate, M.P. 60.5–63° C.

*Example 5.—Didodecyl octadecylthiomethylsuccinate*

By employing equivalent amount of diethyl itaconate for diethyl maleate in the procedure of Example 3, there is obtained didodecyl octadecylthiomethylsuccinate, M.P. ca. 30° C.

*Example 6.—Stabilization of polypropylene*

Unstabilized polypropylene powder (Hercules Profax 6501) is thoroughly blended with 0.5% by weight of didodecyl n-dodecylthiosuccinate and 0.1% by weight of 6 - (4 - hydroxy-3,5-di-t-butylanilino)-2,4-bis-(n-octylthio)-1,3,5-triazine. The blended material thereafter is milled on a two roller mill at 182° C. for 6 minutes, after which time the stabilized polypropylene is sheeted from the mill and allowed to cool.

The milled polypropylene sheet is cut into small pieces and pressed for 7 minutes on a hydraulic press at 218° C. and 174 lbs./in.² The resultant sheets of 25 mil thickness are then tested for resistance to accelerated aging in a forced draft oven at 149° C. The stabilized polypropylene is not subject to deterioration after 600 hours in the oven while the unstabilized material deteriorates after about 3 hours; polypropylene stabilized with 0.5% didodecyl n-dodecylthiosuccinate alone, failed after 23 hours; with 0.1% of 6 - (4-hydroxy-3,5-di-t-butylanilino)-2,4-bis-(n-octylthio)-1,3,5-triazine alone after 56 hours.

The so stabilized polypropylene is not subject to embrittlement or crazing upon exposure in the Fade-O-Meter after more than 150 hours, and does not discolor appreciably during this time.

At elevated temperatures, for example about 300°, the so stabilized polypropylene exhibits very good processing stability and very little polymer degradation as compared to the unstabilized polypropylene.

In the same manner, polypropylene is stabilized with 0.5% of didodecyl dodecylthiosuccinate and 0.1% of di-n - octadecyl - 3,5-di-t-butyl-4-hydroxybenzylphosphonate (weight percent).

The polypropylene composition is stabilized against deterioration for over 2000 hours. The unstabilized polypropylene deteriorates after 3 hours, while when 0.1% by weight alone of di-n-octadecyl-3,5-di-t-butyl-4-hydroxybenzylphosphonate is used, the composition is stabilized for 20 to 30 hours.

Didodecyl dodecylthiomethylsuccinate at a concentration of .5% by weight and 2,4-bis-(3,5-di-t-butyl-4-hydroxyphenoxy)-6-n-octylthio-1,3,5-triazine at a concentration of 0.1% weight when combined in polypropylene in the same fashion stabilize the composition in excess of 2000 hours whereas the individual components stabilize comparable compositions for about 105 and 280 hours respectively. Comparable compositions of didodecyl octadecylthiomethylsuccinate are stabilized for over 1600 hours whereas this compound alone stabilizes for only 95 hours. Dioctadecyl dodecylthiomethylsuccinate and dioctadecyl octadecylthiomethylsuccinate both each stabilize when in combination with this phenolic antioxidant in excess of 1600 hours while alone each stabilizes for only 110 hours.

Similarly when .5% by weight of didodecyl dodecylthiomethylsuccinate and 0.1% of dioctadecyl 3,5-di-t-butyl-4-hydroxybenzylphosphonate are incorporated in polypropylene, the composition is stabilized for over 1500 hours whereas the former component when utilized alone stabilizes only for 20 to 30 hours. A comparable composition alternatively employing didodecyl octadecylthiomethylsuccinate and this phenolic phosphonate is stabilized for over 900 hours whereas compositions utilizing only the former is stabilized for 95 hours.

The above percentages are not critical but are merely given by way of convenience.

What is claimed is:

1. A composition consisting essentially of polypropylene, a stabilizing amount of a phenolic antioxidant, and from about .005 to about 10% of a compound of the formula

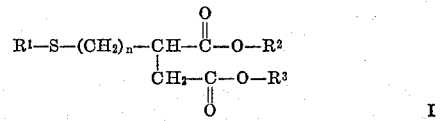

wherein:
R¹ is alkyl of from 8 to 18;
R² and R³ are each alkyl of from 12 to 20 carbon atoms; and
$n$ is zero or 1.

2. A composition as claimed in claim 1 wherein the compound of Formula I is didodecyl dodecylthiosuccinate.

3. A composition as claimed in claim 1 wherein the compound of Formula I is didodecyl dodecylthiomethylsuccinate.

References Cited

UNITED STATES PATENTS

| | | | |
|---|---|---|---|
| 2,496,798 | 2/1950 | Kluge | 252—48.6 |
| 2,581,514 | 1/1952 | Chilcote | 260—481 X |
| 2,703,811 | 3/1955 | Smith | 260—485 |
| 2,846,461 | 8/1958 | Thompson et al. | 252—406 |
| 3,006,945 | 10/1961 | Goddard | 44—76 X |
| 3,136,748 | 6/1964 | Miller et al. | 212—48.6 X |
| 3,145,176 | 8/1964 | Knapp et al. | 252—40 X |
| 3,247,109 | 4/1966 | Benoit | 252—48.6 |

FOREIGN PATENTS 699,440  11/1953  Great Britain.

LEON D. ROSDOL, *Primary Examiner.*

M. WEINBLATT, *Assistant Examiner.*